(12) United States Patent
Barnett et al.

(10) Patent No.: US 8,957,866 B2
(45) Date of Patent: Feb. 17, 2015

(54) MULTI-AXIS NAVIGATION

(75) Inventors: Donald A. Barnett, Monroe, WA (US); Veronica Y. Law, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 726 days.

(21) Appl. No.: 12/822,063

(22) Filed: Jun. 23, 2010

(65) Prior Publication Data

US 2011/0234504 A1 Sep. 29, 2011

Related U.S. Application Data

(60) Provisional application No. 61/317,214, filed on Mar. 24, 2010.

(51) Int. Cl.
*G06F 3/041* (2006.01)
*G06F 3/0485* (2013.01)
*G06F 3/0482* (2013.01)
*G06F 3/0488* (2013.01)

(52) U.S. Cl.
CPC .......... *G06F 3/0485* (2013.01); *G06F 3/0482* (2013.01); *G06F 3/04883* (2013.01)
USPC ........................................................ 345/173

(58) Field of Classification Search
USPC ........................................................ 345/173
See application file for complete search history.

(56) References Cited

U.S. PATENT DOCUMENTS

| | | | |
|---|---|---|---|
| 6,337,694 B1 | 1/2002 | Becker et al. | |
| 6,384,845 B1 | 5/2002 | Takaike | |
| 6,990,637 B2 | 1/2006 | Anthony et al. | |
| 7,146,574 B2 | 12/2006 | Goldthwaite et al. | |
| 7,539,659 B2 | 5/2009 | Wong et al. | |
| 2005/0091596 A1 | 4/2005 | Anthony et al. | |
| 2005/0108233 A1 | 5/2005 | Metsatahti et al. | |
| 2005/0108253 A1 | 5/2005 | Metsatahti et al. | |
| 2005/0160113 A1 | 7/2005 | Sipusic et al. | |
| 2006/0268020 A1 | 11/2006 | Han | |
| 2007/0112732 A1 | 5/2007 | Clark et al. | |
| 2007/0236475 A1 | 10/2007 | Wherry | |
| 2007/0254722 A1 | 11/2007 | Kim et al. | |
| 2008/0098316 A1 | 4/2008 | Declan | |

(Continued)

FOREIGN PATENT DOCUMENTS

CN 1875336 12/2006
CN 101196793 6/2008

(Continued)

OTHER PUBLICATIONS

"PCT Search Report and Written Opinion", Application No. PCT/US2011/028561, (Oct. 31, 2011), 13 pages.

(Continued)

*Primary Examiner* — David D Davis
(74) *Attorney, Agent, or Firm* — Bryan Webster; Kate Drakos; Micky Minhas

(57) ABSTRACT

Multi-axis navigation techniques are described. In implementations, a user interface is output by a computing device, the user interface includes a first axis and a second axis that include parameters that are navigable via one or more gestures. One or more items are chosen by the computing device for concurrent display with the first and second axes that correspond to a first one of the parameters of the first axis and a second one of the parameters of the second axis.

18 Claims, 7 Drawing Sheets

(56) References Cited

U.S. PATENT DOCUMENTS

| | | | |
|---|---|---|---|
| 2008/0129686 | A1 | 6/2008 | Han |
| 2008/0152298 | A1 | 6/2008 | Ubillos |
| 2008/0244453 | A1 | 10/2008 | Cafer |
| 2009/0193034 | A1 | 7/2009 | Hirasaki |
| 2009/0276714 | A1 | 11/2009 | Kandlikar et al. |
| 2009/0300497 | A1 | 12/2009 | Billmaier et al. |
| 2010/0057696 | A1 | 3/2010 | Miyazawa et al. |
| 2010/0313125 | A1* | 12/2010 | Fleizach et al. ............... 715/702 |
| 2010/0321289 | A1 | 12/2010 | Kim et al. |
| 2011/0239149 | A1 | 9/2011 | Lazo |

FOREIGN PATENT DOCUMENTS

| | | |
|---|---|---|
| KR | 20090069344 | 6/2009 |
| KR | 20090073084 | 7/2009 |

OTHER PUBLICATIONS

"Non-Final Office Action", U.S. Appl. No. 13/029,943, (Dec. 19, 2012), 21 pages.

Hoeber, et al., "BrowseLine: 2D Timeline Visualization of Web Browsing Histories", Retrieved at << http://www.cs.mun.ca/~hoeber/download/2009__iv__browseline.pdf >>, IV, Proceedings of the 2009 13th International Conference Information Visualisation, Jul. 15-17, 2009, pp. 6.

"Examples of Using SketchUp to Organize Information", Retrieved at << http://schoolcomputing.wikia.com/wiki/Examples__of__Using__SketchUp__to__Organize__Information >>, Retrieved Date: Apr. 17, 2010, pp. 3.

"Final Office Action", U.S. Appl. No. 13/029,943, (Mar. 29, 2013), 25 pages.

"Non-Final Office Action", U.S. Appl. No. 13/029,943, Jan. 17, 2014, 23 pages.

"Final Office Action", U.S. Appl. No. 13/029,943, May 20, 2014, 30 pages.

"Foreign Office Action", CN Application No. 201180015206.6, Sep. 2, 2014, 13 Pages.

"Foreign Office Action", CL Application No. 201202530, Aug. 26, 2014, 8 Pages.

\* cited by examiner

MULTI-AXIS NAVIGATION

RELATED APPLICATIONS

This application claims priority to U.S. Provisional Patent Application No. 61/317,214 filed Mar. 24, 2010, and titled "Mobile Communications Device Timeline Control," the entire disclosure of which is hereby incorporated by reference.

BACKGROUND

The amount of content that is encountered by users in a typical day is ever increasing. For example, due to the inclusion of cameras on mobile phones a user may take have access to hundreds of pictures both taken by the user as well as from other users. Further, the user may also be confronted with thousands of other items of content, such as other media (e.g., videos), documents, emails, text messages, and so on.

Consequently, it may be difficult for a user to locate content of interest using traditional techniques, such as to manually navigate through a hierarchy of folders used to organize the content. Further, it may be even more difficult for a user to locate related content using traditional techniques. Accordingly, traditional techniques may lead to user frustration and even to forgo functionality due to the complexities involved with relatively large amounts of content.

SUMMARY

Multi-axis navigation techniques are described. In implementations, a user interface is output by a computing device, the user interface includes a first axis and a second axis that include parameters that are navigable via one or more gestures. One or more items are chosen by the computing device for concurrent display with the first and second axes that correspond to a first one of the parameters of the first axis and a second one of the parameters of the second axis.

In implementations, one or more inputs are recognized as selecting a first one of a plurality of parameters in a first axis and a second one of a plurality of parameters in a second axis in a user interface output by a computing device using one or more gestures. The first axis is arranged in the user interface as generally perpendicular to the second axis. One or more items are output in the user interface that correspond the first and second parameters.

In implementations, a computing device includes a housing, a display device disposed on the housing, and one or more modules disposed within the housing. The one or more modules are configured to display a user interface on the display device, the user interface including a first axis and a second axis that include parameters that are navigable via one or more gestures detected via touchscreen functionality of the computing device, that are positioned as generally perpendicular, one or another; and that are selectable via the gestures to cause output of items in the user interface that correspond to the parameters.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional techniques that were used to organize and locate content may become inefficient when confronted with a large number of content. For example, it may become cumbersome to locate a particular item of content a hierarchical arrangement of menus. It may be even more difficult to locate related items of content using traditional techniques, thus leading to potential user frustration.

Multi-axis navigation techniques are described. In implementations, a user interface includes a first axis and a second axis that is arranged generally perpendicular to the first axis. Each axis may be navigated using a gesture to select a particular parameter included in the axis. For example, the first axis may describe particular months and the second axis may describe particular years. Selection of the month and year may then serve as a basis to locate content for output in the user interface, such as images that were captured at that point in time. The multi-axis navigation may also be leveraged to locate related content, such as to navigate through Halloween photos through multiple years for the month of October. In this way, a user may readily navigate through a large amount of content to locate content of interest as well as to navigate through related content. Further discussion of the multi-axis navigation techniques may be found in relation to the following sections.

In the following discussion, an example environment is first described that is operable to employ the multi-axis navigation techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
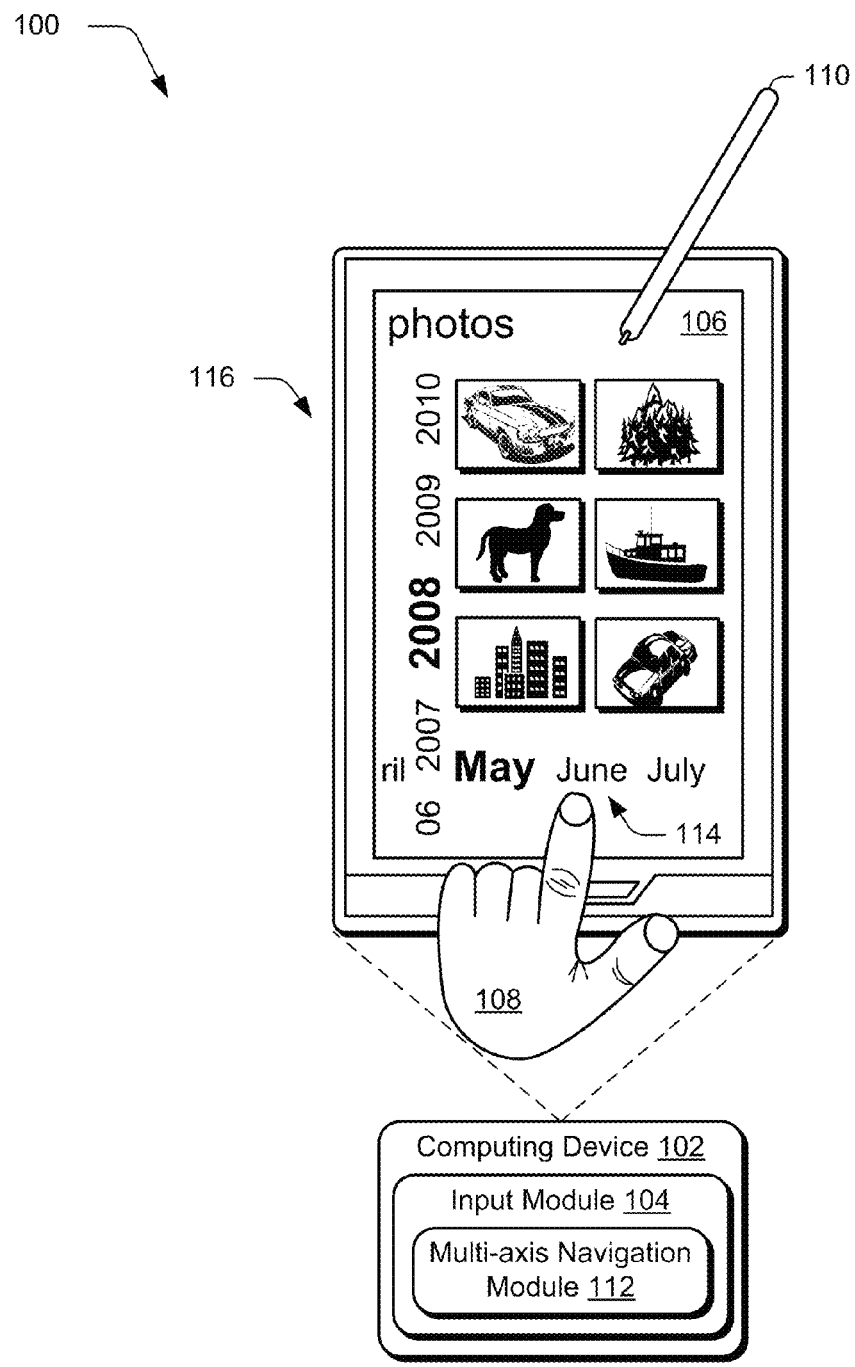
FIG. 1 is an illustration of an environment in an example implementation that is operable to employ multi-axis navigation techniques described herein.

FIG. 1 is an illustration of an environment 100 in an example implementation that is operable to employ multi-axis navigation techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input module 104. The input module 104 is representative of functionality relating to inputs of the computing device 102. For example, the input module 104 may be configured to receive inputs from a keyboard, mouse, to identify gestures and cause operations to be performed that correspond to the gestures, and so on. The inputs may be identified by the input module 104 in a variety of different ways.

For example, the input module 104 may be configured to recognize an input received via touchscreen functionality of a display device 106, such as a finger of a user's hand 108 as proximal to the display device 106 of the computing device 102, from a stylus 110, and so on. The input may take a variety of different forms, such as to recognize movement of the stylus 110 and/or a finger of the user's hand 108 across the display device 106, such as a tap, drawing of a line, and so on. In implementations, these inputs may be recognized as gestures.

A variety of different types of gestures may be recognized, such a gestures that are recognized from a single type of input (e.g., touch gestures) as well as gestures involving multiple types of inputs. For example, the computing device 102 may be configured to detect and differentiate between a touch input (e.g., provided by one or more fingers of the user's hand 108) and a stylus input (e.g., provided by a stylus 110). Thus, the input module 104 may support a variety of different gesture techniques by recognizing and leveraging a division between stylus and touch inputs.

Additionally, although the following discussion may describe specific examples of touch and stylus inputs, in instances the types of inputs may be switched (e.g., touch may be used to replace stylus and vice versa) and even removed (e.g., both inputs may be provided using touch or a stylus) without departing from the spirit and scope thereof. Further, although in instances in the following discussion the gestures are illustrated as being input using touchscreen functionality, the gestures may be input using a variety of different techniques by a variety of different devices, such as to be captured by a camera for use as part of a natural user interface (NUI).

The computing device 102 is further illustrated as including a multi-axis navigation module 112. The multi-axis navigation module 112 is representative of functionality of the computing device 102 to configure a user interface for multi-axis navigation. As illustrated on the display device 106, an example user interface is shown having a first axis 114 and a second axis 116 that is arranged as generally perpendicular to the first axis 114, although other arrangements are also contemplated, e.g., parallel.

Each of the axes includes parameters that are selectable to identify corresponding content to be output in the user interface. For instance, the first axis 114 is illustrated as referencing particular months and the second axis 116 is illustrated as representing particular years. Selection of the parameters from each of the axes may serve as a basis for outputting content that corresponds to the parameters. Thus, in this way a user may readily select parameters to locate content of interest and also readily navigate through related content, further discussion of which may be found in relation to the implementation examples below.

Figure 2:
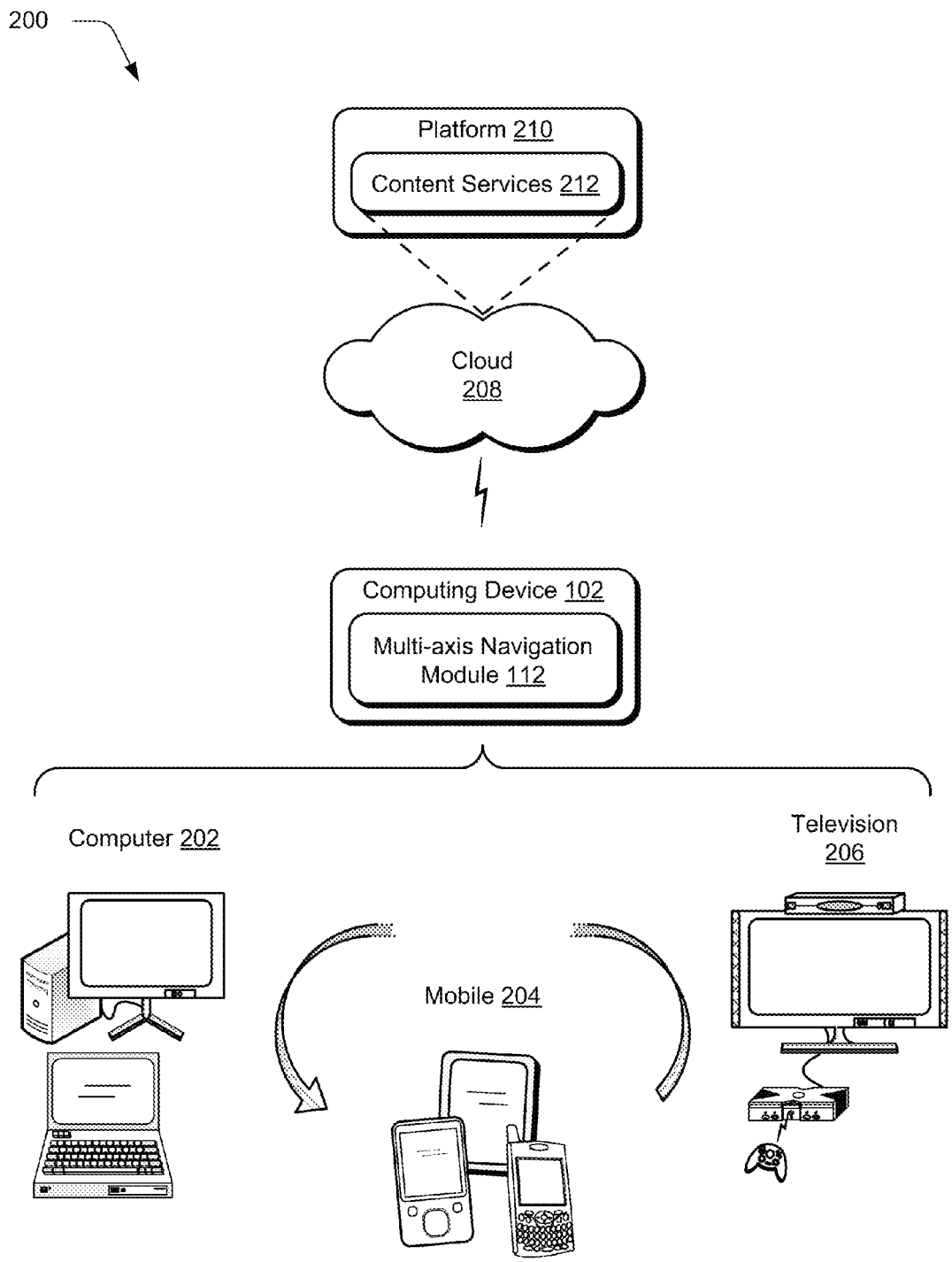
FIG. 2 is an illustration of an example system showing a multi-axis navigation module of FIG. 1 as being implemented using in an environment where multiple devices are interconnected through a central computing device.

FIG. 2 illustrates an example system 200 that includes the computing device 102 as described with reference to FIG. 1. The example system 200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the client device 102 may assume a variety of different configurations, such as for computer 202, mobile 204, and television 206 uses. Each of these configurations includes devices that may have generally different constructs and capabilities, and thus the computing device 102 may be configured according to one or more of the different device classes. For instance, the computing device 102 may be implemented as the computer 202 class of a device that includes a personal computer, desktop computer, a multi-screen computer, laptop computer, netbook, and so on.

The computing device 102 may also be implemented as the mobile 202 class of device that includes mobile devices, such as a mobile phone, portable music player, portable gaming device, a tablet computer, a multi-screen computer, and so on. The computing device 102 may also be implemented as the television 206 class of device that includes devices having or connected to generally larger screens in casual viewing environments. These devices include televisions, set-top boxes, gaming consoles, and so on. The multi-axis navigation techniques described herein may be supported by these various configurations of the client device 102 and are not limited to the specific examples of multi-axis navigation techniques described herein.

The cloud 208 includes and/or is representative of a platform 210 for content services 212. The platform 210 abstracts underlying functionality of hardware (e.g., servers) and software resources of the cloud 208. The content services 212 may include applications and/or data that can be utilized while computer processing is executed on servers that are remote from the client device 102. Content services 212 can be provided as a service over the Internet and/or through a subscriber network, such as a cellular or WiFi network.

The platform 210 may abstract resources and functions to connect the computing device 102 with other computing devices. The platform 210 may also serve to abstract scaling of resources to provide a corresponding level of scale to encountered demand for the content services 212 that are implemented via the platform 210. Accordingly, in an interconnected device embodiment, implementation of functionality of the multi-axis navigation module 112 may be distributed throughout the system 200. For example, the multi-axis navigation module 112 may be implemented in part on the computing device 102 as well as via the platform 210 that abstracts the functionality of the cloud 208.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the multi-axis navigation techniques described below are platform-independent, meaning that the techniques may be implemented on a variety of commercial computing platforms having a variety of processors.

Multi-Axis Navigation Implementation Example

Figure 3:
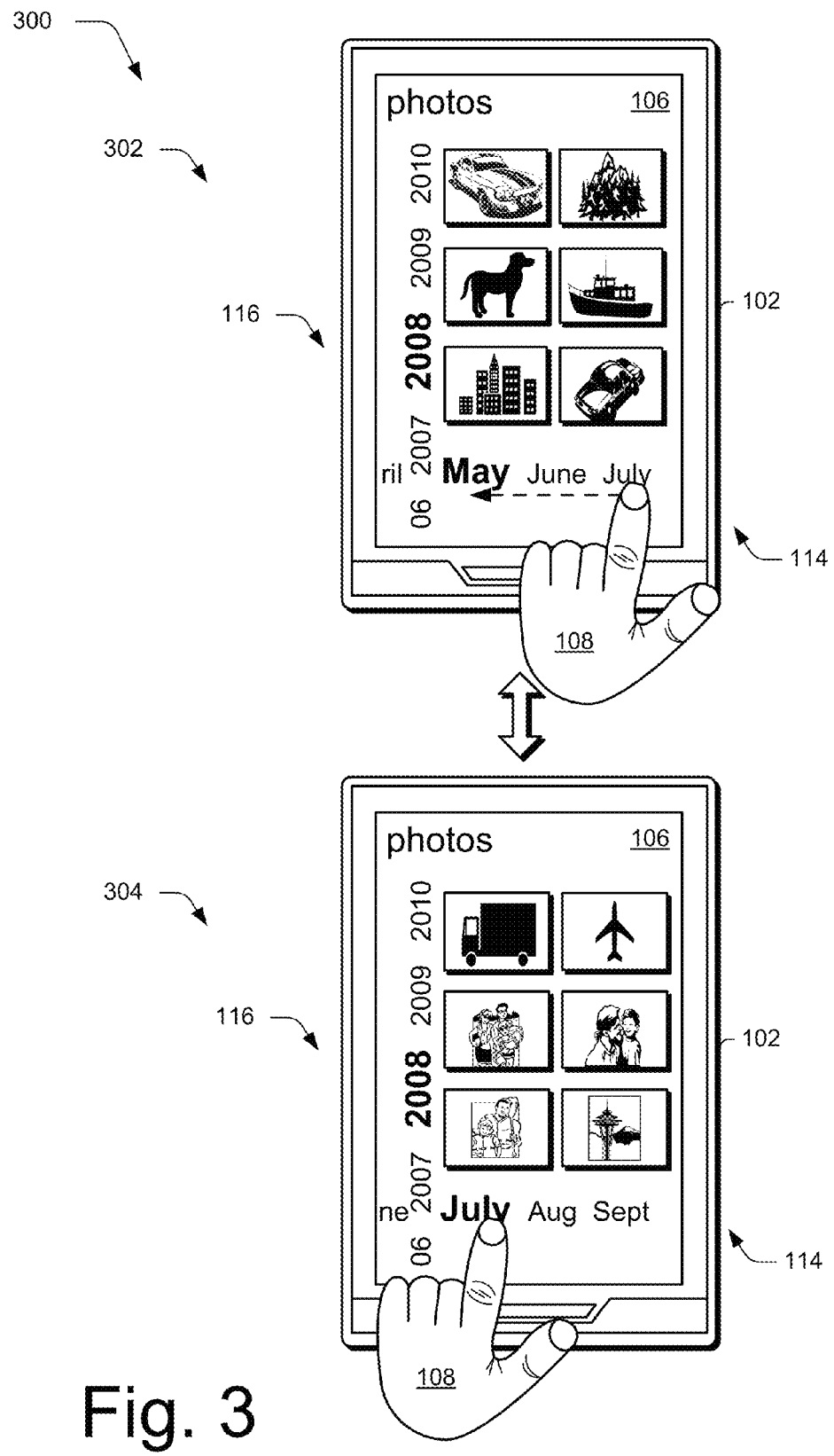
FIG. 3 is an illustration of a system in an example implementation in which multi-axis navigation techniques through a first and second axis that may be used to specify a particular point in time are described.

FIG. 3 illustrates a system 300 in an example implementation in which multi-axis navigation techniques through a first and second axis that may be used to specify a particular point in time are described. The system 300 is illustrated using first and second stages 302, 304. At the first stage 302, the computing device 102 is illustrated as outputting a user interface configured for multi-axis navigation having first and second axes 114, 116.

As before, the first axis 114 is configured to include parameters relating to months and the second axis 114 is configured to include parameters relating to years. Therefore, parameters may be selected using the first and second axes to specify a particular month, an example of which is illustrated as "May 2009" by giving focus to the selected parameters in the first and second axes 114, 116. Content that corresponds to the selected parameters is illustrated as output in conjunction with the first and second axes 114, 116, which in this example are images captured at the particular point in time specified, e.g., May 2008.

To select different parameters, and therefore specify content for output that corresponds to the different parameters, the user may interact with the first and/or second axes 114, 116 in a variety of ways. For example, a drag gesture may be used which involves selecting a point along an axis and subsequent movement in a direction to change which parameter of the axis is highlighted. The illustrated example is shown as a selection made using a finger of the user's hand 108 of a parameter "July" and subsequent movement (illustrated through use of a phantom arrow) along the first axis 114 toward a point of the first axis that is given focus.

A result of the drag gesture is illustrated at the second stage 304. The month "July" is illustrated as being selected through the use of focus in this example. Therefore, at this point the parameter "July" is selected for the first stage 114 while the parameter "2008" is still selected for the second stage 116 thereby referencing a particular point in time, e.g., July 2008. Accordingly, the multi-axis navigation module 112 may cause output of content (e.g., images) that correspond to the particular point in time. In an implementation, this output may be performed in real time as one or more axes are scrolled. Naturally, other implementations are also contemplated, such as to update the user interface when the drag gesture is completed. Thus, in this example a user may quickly navigate through months in a year using the first axis 114. The user may also interact with the second axis to navigate through years, further discussion of which may be found in relation to the following figure.

Figure 4:
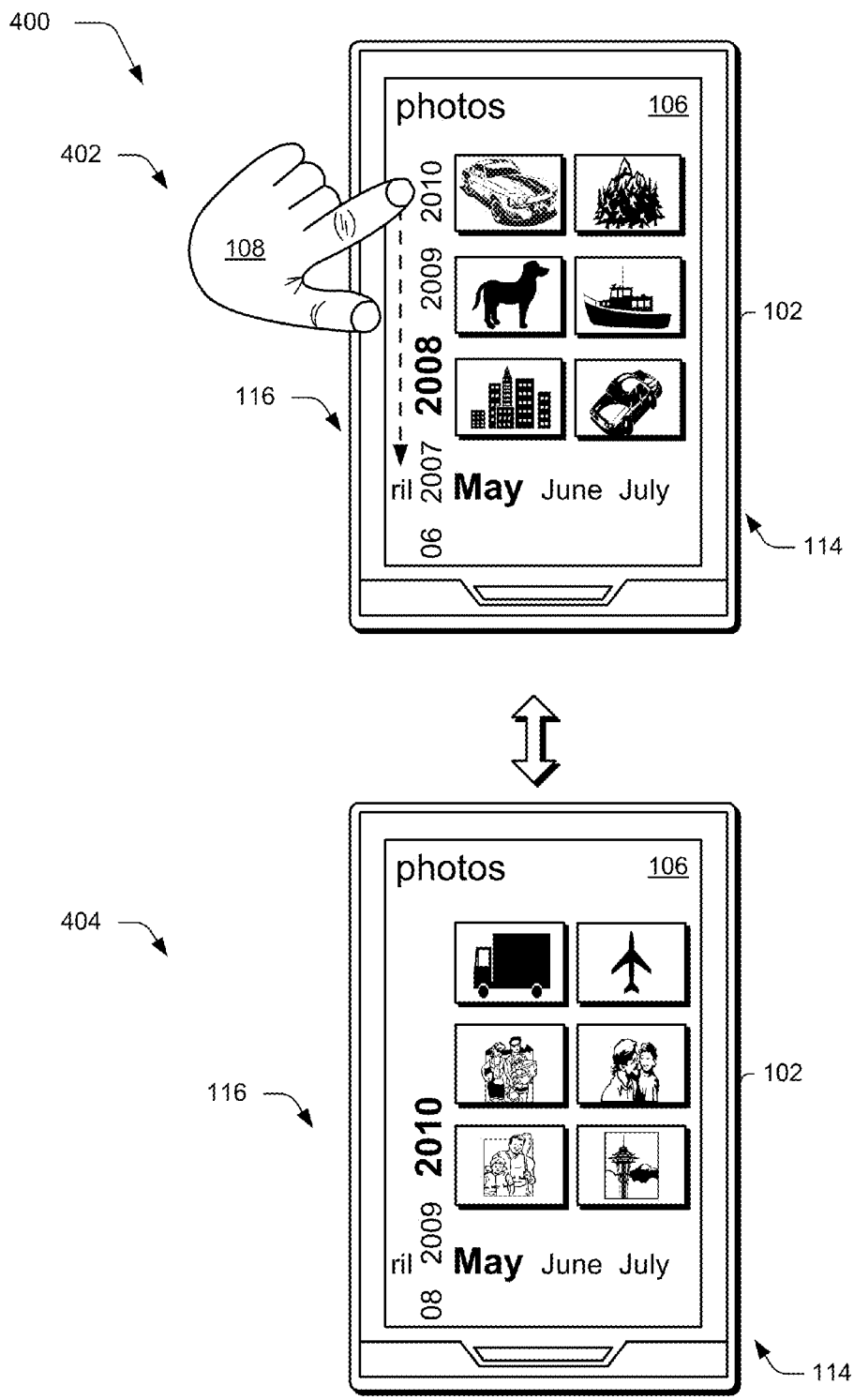
FIG. 4 illustrates a system in another example implementation in which multi-axis navigation techniques are described through a first and second axis that may be used to specify a particular point in time.

FIG. 4 illustrates a system 400 in another example implementation in which multi-axis navigation techniques through a first and second axis that may be used to specify a particular point in time are described. As before, system 400 is illustrated using first and second stages 402, 404. At the first stage 402, the computing device 102 is again illustrated as outputting a user interface configured for multi-axis navigation having first and second axes 114, 116.

In this example, a drag gesture is illustrated as being input in conjunction with the second axis 116. The finger of the user's hand 108 is shown as selecting a particular parameter (e.g., 2010) and subsequently moved (e.g., illustrated through use of a phantom line) to complete the gesture, such as by moving toward an area having focus. A result of this gesture is illustrated in the second stage 404 in which the parameter for a year "2010" is shown as selected. Accordingly, the multi-axis navigation module 112 may output the content that corresponds to the month "May" in the first axis 114 and the year "2010" in the second axis 116.

By scrolling through the parameters in the axes, the user may navigate through corresponding content that is related. For example, the user may select the month "December" in the first axis 114 and then navigate through different years in the second axis 116 to view images taken during the holiday season. Although the examples of FIGS. 3 and 4 described parameters such as "month" and "year" to specify a particular point in time, a variety of different parameters may be utilized to specify a particular point in time, another example of which may be found in relation to the following figure.

Figure 5:
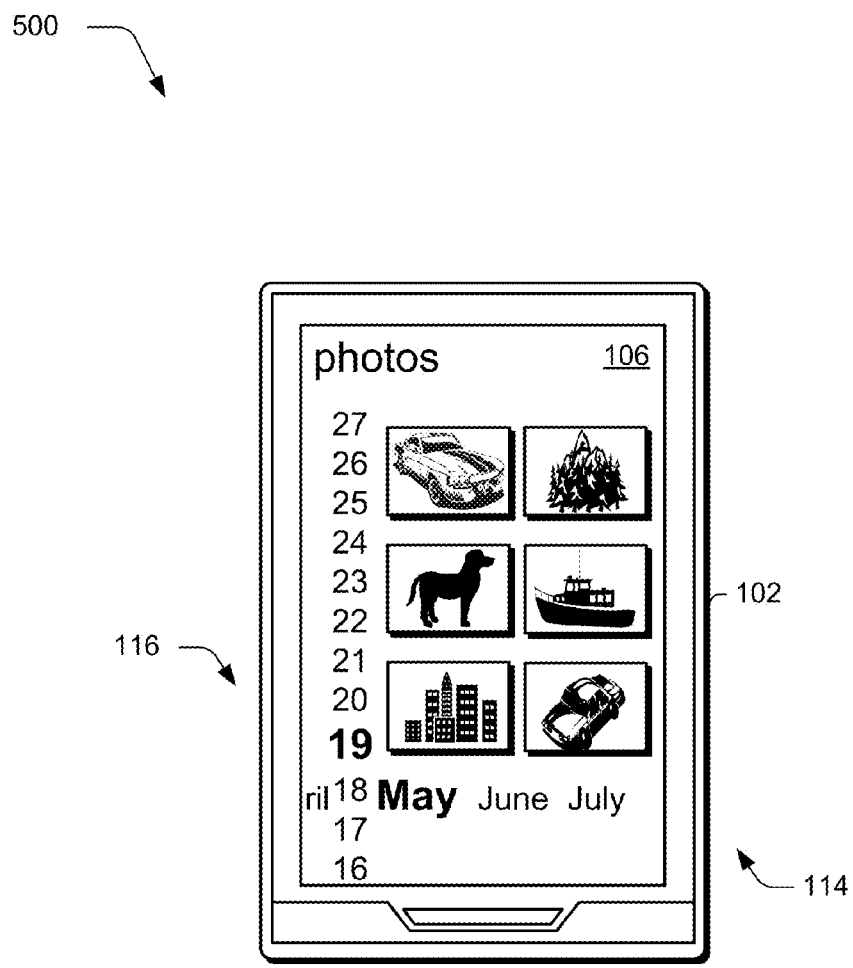
FIG. 5 illustrates a system in another example implementation in which multi-axis navigation techniques are described through a first and second axis that are used to specify a particular point in time as a day.

FIG. 5 illustrates a system 500 in another example implementation in which multi-axis navigation techniques through a first and second axis that may be used to specify a particular point in time as a day are described. In this example, the first axis 114 is again show as including parameters that reference particular months. The second axis 116, however, is shown as referencing particular days. Therefore, in this example day "May 19" is selected using the first and second axes 114, 116 and the multi-axis module may output content that corresponds to the particular day. Thus, it should be readily apparent that a wide variety of points to time may be specified using the multi-axis techniques described herein, such as particular days, weeks, months, and so on.

A wide variety of other parameters may also be specified using the multi-axis techniques described herein to locate and determine relatedness of a wide variety of different content. For example, the multi-axis techniques may specify a particular type of document and author to locate documents, a particular type and title to locate media, a particular sender or recipient along with a parameter relating to time to locate emails, text messages, voicemails, or other communications, and so on. Additionally, in an implementation a user interface may be output to specify parameters to be used by the first and/or second axes 114, 116 as well as to specify a type of content that is to be subject of a search using the parameters. Further, more than two axes may be employed without departing from the spirit and scope thereof. A variety of other examples are also contemplated as further discussed below.

Example Procedure

The following discussion describes multi-axis navigation techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 300-500 of FIGS. 3-5.

Figure 6:
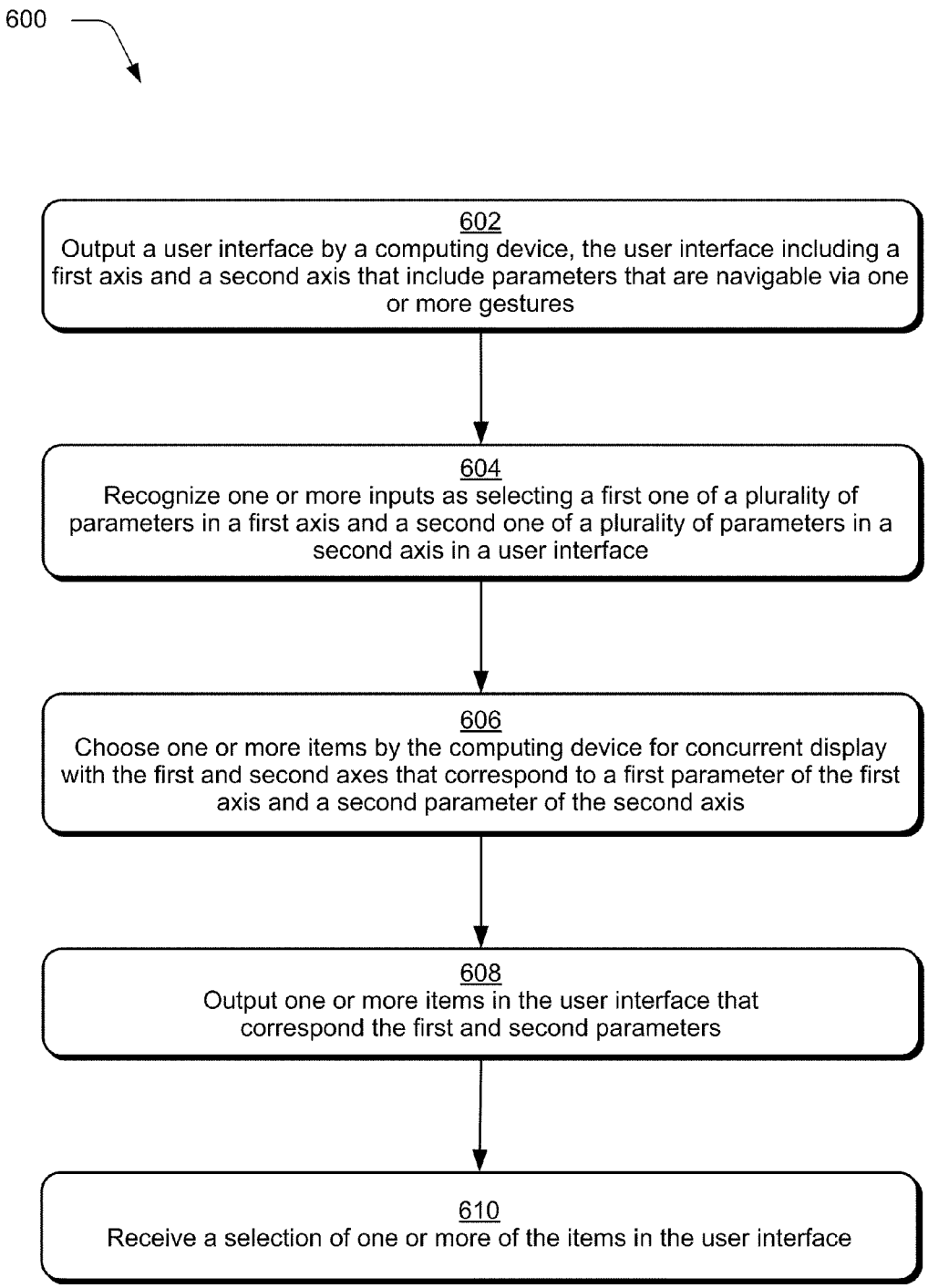
FIG. 6 depicts a procedure in an example implementation in which multi-axis navigation techniques are used to output content that corresponds to included parameters.

FIG. 6 depicts a procedure 600 in an example implementation in which multi-axis navigation techniques are used to output content that corresponds to included parameters. A user interface is output by a computing device, the user interface including a first axis and a second axis that include parameters that are navigable via one or more gestures (block 602). The first and second axes may be arranged in a variety of ways, such as generally perpendicular as shown in FIGS. 3-5, as generally parallel, at angle to each other, as partially or substantially overlapping, and so on.

Additionally, a variety of different parameters may be included on the axes. For example, the axes may be used to describe a particular point in time through inclusion of parameters that specify a time of day, day (e.g., a day of a week, a day of a year), week (e.g., in a month, year, and so on), year, and so forth. A variety of other parameters may also be leveraged by the first and/or second axes, such as author, genre, composer, musician, group, type (e.g., email, instant message, document, media, video, blog, micro-blog, etc.), source (e.g., local, remote, streaming), topic, and so on. For instance, a user may configure the parameters manually as well as what is being searched (e.g., document, images, or other type as described above) manually through interaction with a user interface. A variety of other examples are also contemplated.

One or more inputs are recognized as selecting a first one of a plurality of parameters in the first axis and a second one of a plurality of parameters in a second axis in a user interface, the first axis arranged in the user interface as generally perpendicular to the second axis (block 604). For example, a drag or other gesture may be utilized to scroll one or more of the axes to select particular parameters included in the axes. A variety of other techniques may also be employed, such as a "tap" gesture to select a parameter, use of a cursor control device, and so forth.

One or more items are chosen by the computing device for concurrent display with the first and second axes that correspond to a first parameter in the first axis and a second parameter in the second axis (block 606). For example, a gesture may be received to select a parameter "July" in the first axis 114 and the parameter "2008" that is already referenced in the second axis 116. Accordingly, the multi-axis navigation module 112 may output content (e.g., images) that corresponds to the first and second parameters (block 608), such as to view representations of the content (e.g., icons of documents or music files, thumbnails of videos or images, etc.) and/or the content itself, e.g., images in their entirety.

A selection is received of one or more of the items in the user interface (block 610). Continuing with the previous example, the content shown with the first and second axes may be selectable to initiate output of the content, such as to show an image full screen, begin rendering of a video, music or other media, output of a document for editing, and so on. Thus, a user may navigate to content of interest using the multi-axis navigation techniques and then initiate the content through interaction with the user interface. Naturally, a variety of other examples are also contemplated, such as to initiate output automatically.

Example Device

Figure 7:
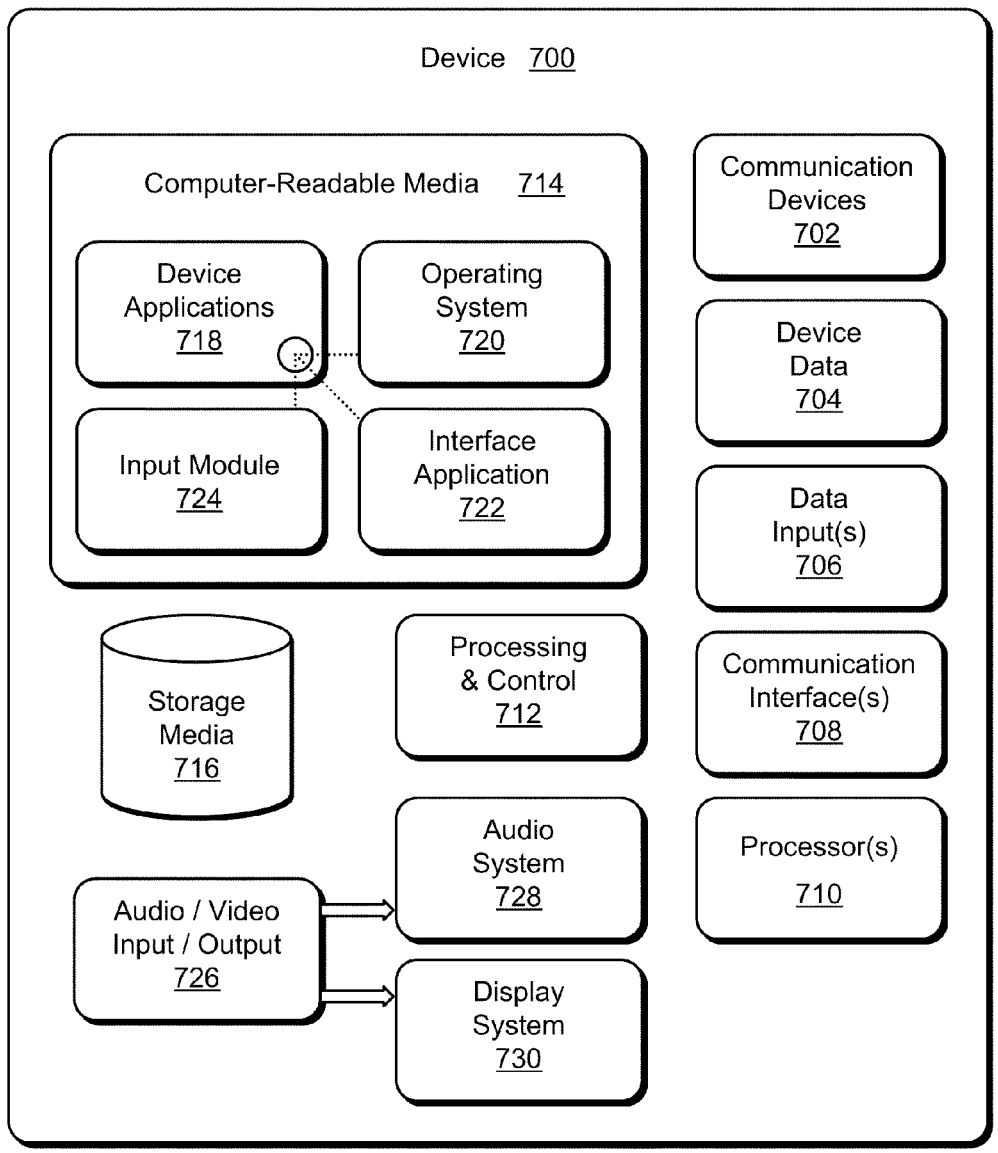
FIG. 7 illustrates various components of an example device that can be implemented as any type of portable and/or computer device as described with reference to FIGS. 1-5 to implement embodiments of the multi-axis navigation techniques described herein.

FIG. 7 illustrates various components of an example device 700 that can be implemented as any type of portable and/or computer device as described with reference to FIGS. 1 and 2 to implement embodiments of the gesture techniques described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more o\f a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable instructions to control the operation of device 700 and to implement embodiments of a touch pull-in gesture. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.). The device applications 718 also include any system components or modules to implement embodiments of the gesture techniques described herein. In this example, the device applications 718 include an interface application 722 and an input module 724 (which may be the same or different as input module 114) that are shown as software modules and/or computer applications. The input module 724 is representative of software that is used to provide an interface with a device configured to capture inputs, such as a touchscreen, track pad, camera, and so on. Alternatively or in addition, the interface application 722 and the input module 724 can be implemented as hardware, software, firmware, or any combination thereof. Additionally, the input module 724 may be configured to support multiple input devices, such as separate devices to capture touch and stylus inputs, respectively. For example, the device may be configured to include dual display devices, in which one of the display device is configured to capture touch inputs while the other stylus inputs.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   outputting a user interface by a computing device, the user interface including:
      a first axis including a concurrent display of a plurality of parameters that are navigable via one or more gestures; and
      a second axis including a concurrent display of a plurality of parameters that are also navigable via one or more gestures, the first axis arranged in the user interface as generally perpendicular to the second axis;
   positioning a first said parameter of the first axis at an intersection with a second said parameter of the second axis in response to recognition of one or more gestures by the computing device; and;
   responsive to the positioning, displaying one or more items that correspond to the first and second said parameters in a concurrent display with the first and second said parameters of the respective first and second axes.

2. A method as described in claim 1, wherein the one or more gestures include a drag gesture.

3. A method as described in claim 1, wherein the first said parameter and the second said parameter reference a point in time and the one or more items correspond to the point in time.

4. A method as described in claim 3, wherein the point in time is a particular day, week, or month.

5. A method as described in claim 3, wherein the one or more items correspond to the point in time by being created at that point in time.

6. A method as described in claim 1, wherein at least one of the items is selectable to cause an output of the item.

7. A method as described in claim 1, wherein the one or more items are representations of images, media, video, or songs.

8. A method as described in claim 1, wherein the one or more items are representations of email or text messages.

9. One or more computer-readable media comprising instructions stored thereon that, responsive to execution by a computing device, causes the computing device to perform operations comprising:
   outputting a user interface by a computing device, the user interface including:
      a first axis including a display of a plurality of parameters that are navigable via one or more gestures; and
      a second axis including a display of a plurality of parameters that are navigable via one or more gestures;
   positioning a first said parameter of the first axis at an intersection with a second said parameter of the second axis in response to recognition of one or more gestures by the computing device; and
   responsive to the positioning, displaying one or more items that correspond to the first and second said parameters in a concurrent display with the first and second said parameters of the respective first and second axes.

10. One or more computer-readable media as described in claim 9, wherein the first axis is arranged in the user interface as generally perpendicular to the second axis.

11. One or more computer-readable media as described in claim 9, wherein the first and second said parameters are selected via the one or more gestures.

12. One or more computer-readable media as described in claim 9, wherein the first said parameter and the second said parameter reference a point in time and the one or more items correspond to the point in time.

13. One or more computer-readable media as described in claim 12, wherein the point in time is a particular day, week, or month.

14. A computing device comprising:
   a housing;
   a display device disposed on the housing; and
   one or more modules disposed within the housing, the one or more modules configured to perform operations comprising:
      outputting a user interface including:
         a first axis including a display of a plurality of parameters that are navigable via one or more gestures; and
         a second axis including a display of a plurality of parameters that are navigable via one or more gestures;

positioning a first said parameter of the first axis at an intersection with a second said parameter of the second axis in response to recognition of one or more gestures by the computing device; and displaying one or more items that correspond to the first and second said parameters in a concurrent display with the first and second said parameters of the respective first and second axes.

15. A computing device as described in claim 14, wherein the first axis is arranged in the user interface as generally perpendicular to the second axis.

16. A computing device as described in claim 14, wherein the first and second said parameters are selected via the one or more gestures.

17. A computing device as described in claim 16, wherein the first said parameter and the second said parameter reference a point in time and the one or more items correspond to the point in time.

18. A computing device as described in claim 16, wherein the point in time is a particular day, week, or month.

* * * * *